Jan. 26, 1965 W. H. WHITTINGTON 3,167,398
METERING APPARATUS
Filed June 23, 1961 2 Sheets-Sheet 1
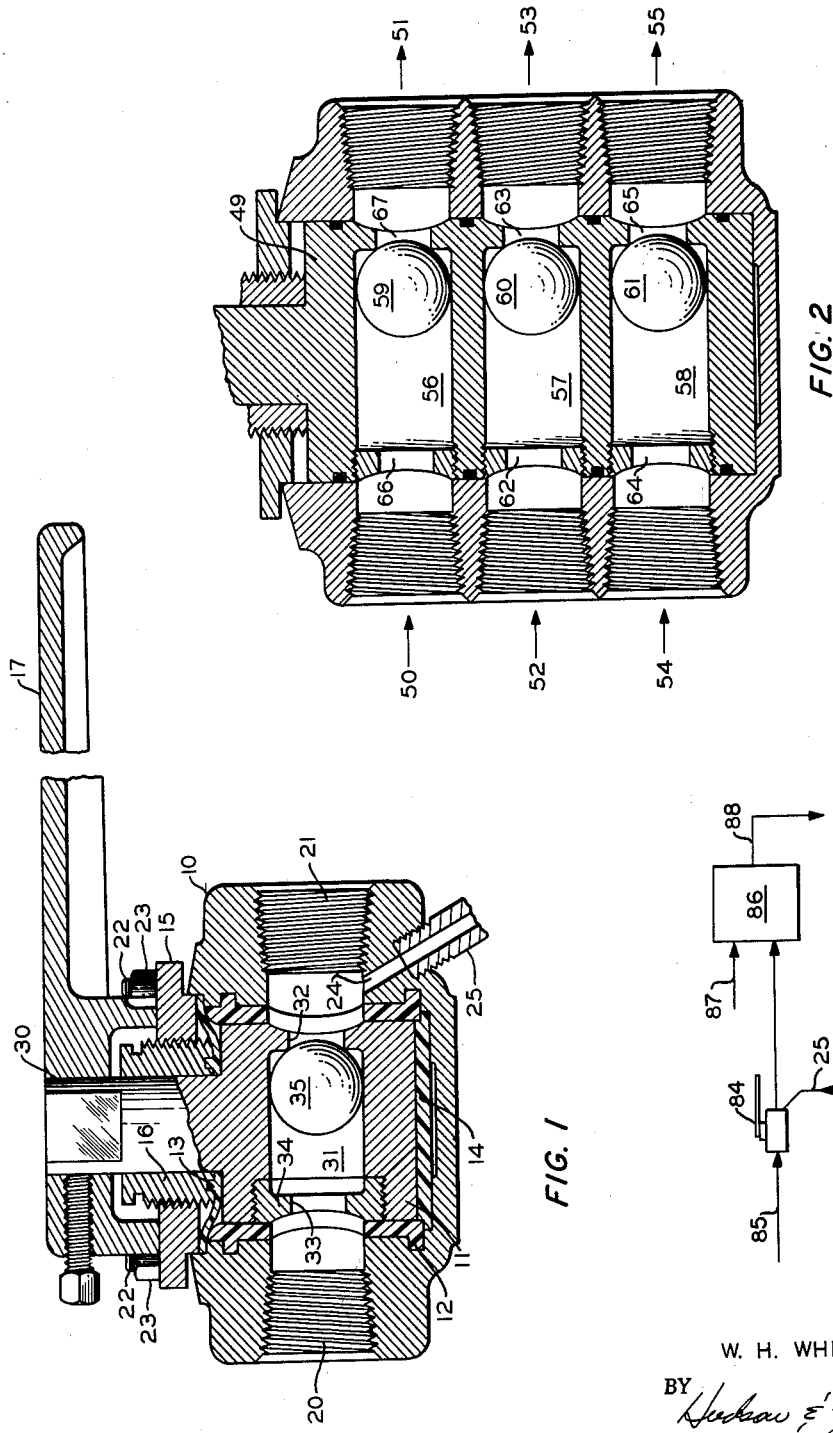
INVENTOR.
W. H. WHITTINGTON
BY
ATTORNEYS Jan. 26, 1965    W. H. WHITTINGTON    3,167,398
METERING APPARATUS
Filed June 23, 1961    2 Sheets-Sheet 2

INVENTOR.
W. H. WHITTINGTON
BY
ATTORNEYS 3,167,398
METERING APPARATUS
William H. Whittington, Bartlesville, Okla., assignor to Phillips Petroleum Company, a corporation of Delaware
Filed June 23, 1961, Ser. No. 119,123
11 Claims. (Cl. 23—285)

This invention relates to feeding measured quantities of a material. In one aspect this invention relates to a metering apparatus comprising a rotatable member having a chamber extending therethrough, and means to alternately accumulate and discharge measured amounts of a material as the member is rotated and the chamber extends between an inlet and an outlet alternately in opposite directions. In another aspect this invention relates to a method for metering a material comprising the steps of alternately aligning a metering chamber with an inlet and an outlet in one direction and then in the opposite direction and automatically closing that end of the chamber which is adjacent the outlet, thus, with each rotation of the chamber, accumulating and discharging a measured amount of the material. In another aspect this invention relates to a method and apparatus for carrying out a catalytic reaction.

There are many instances in which it is desirable to feed very accurately metered amounts of a material. One example of such an instance is the feeding of catalyst to a polymerization process. In many such cases the reaction rate can be controlled by controlling the rate of catalyst feed. To insure accurate feeding rate and to prevent feed stoppage it is preferred that positive feed be provided for the material.

An object of this invention is to provide means for accurately metering and positively feeding a fluent material.

Another object of this invention is to provide a novel method for accurately metering and positively feeding fluent material.

Another object of this invention is to provide novel method and apparatus for carrying out a catalytic reaction.

Other aspects, objects and the advantages of my invention are apparent in the written description, the drawings and the claims.

According to my invention there is provided metering apparatus including a body having an inlet and an outlet, a member containing a metering chamber, rotatable within the body, the chamber extending between and communicating with the inlet and outlet in at least two positions, and a piston slidably fitted into the chamber and moveable responsive to flow through the inlet to close the outlet in each of the noted positions. I have found the invention can be applied to a metering apparatus having a single chamber in the rotatable member and a single inlet and outlet in the body and to apparatus having more than one chamber and a single inlet and outlet, more than one chamber and more than one inlet and outlet, and a single chamber with more than one inlet and outlet. In certain applications the chambers are spaced along the axis of rotation of the rotatable member in which case separate inlets and outlets are provided for each chamber. My invention also encompasses an apparatus including a rotatable member having more than one non-communicating chamber with the openings to these chambers aligned in a plane perpendicular to the axis of rotation in which apparatus either a single inlet and outlet or a plurality of inlets and outlets can be used. I have found that an improved apparatus for carrying out a catalytic reaction is provided by the combination of my metering apparatus with a reactor and means for feeding a reactant and a slurried catalyst to the reactor, the catalyst being metered through the metering apparatus.

Also according to my invention there is provided a novel method for metering and feeding a fluent material which comprises the steps of alternately aligning a metering chamber with an inlet and an outlet urging flow through the chamber in one direction, and with an inlet and an outlet urging flow through the chamber in the opposite direction and automatically closing the opening of chamber adjacent the outlet responsive to the flow of the material into the chamber, thus alternately filling and discharging the chamber. My invention includes the use of this novel method for metering and feeding a slurried catalyst to a reaction zone to which there is also fed a reactant and from which a product is removed.

In the drawing:

FIGURE 1 is a vertical cross section of a metering device having a single chamber and a single inlet and outlet.

FIGURE 2 is a vertical cross section of a metering apparatus having a plurality of metering chambers spaced along the axis of rotation of a rotatable member, and a separate inlet and outlet for each member.

FIGURE 6 illustrates metering apparatus applied to feeding measured amounts of catalyst to a polymerization reaction.

Figure 4:
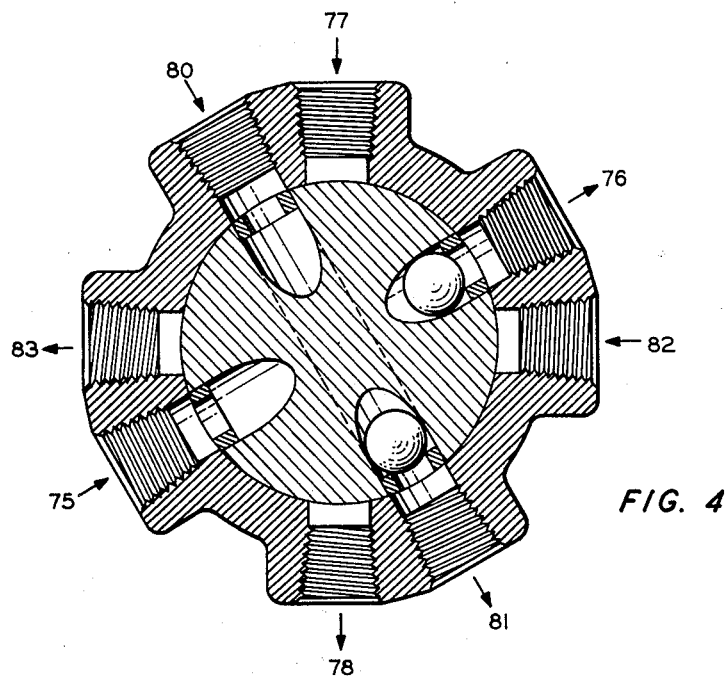
FIGURE 4 is a horizontal cross section of the apparatus of FIGURE 3.

The device illustrated in FIGURE 1 comprises a body 10, a rotatable member 11, a resilient sleeve 12, a resilient diaphragm 13, a resilient thrust disc 14, a cover 15, a gland 16, and an actuating lever 17.

Body 10 is provided with a threaded inlet 20 and a threaded outlet 21. Cover 15 is held in place with studs 22 and nuts 23. A drilled opening 24 provided with a threaded connection as shown is connected with a conduit 25.

Figure 5:
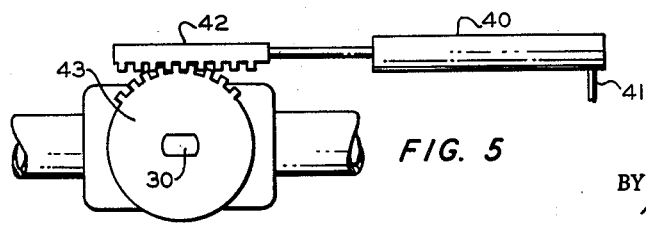
FIGURE 5 illustrates an air cylinder actuated metering apparatus.

Member 11 comprises pin 30, cylindrical chamber 31, and ball seats 32 and 33. Ball seat 33 is formed on an insert 34 which is inserted after inserting ball 35. Ball 35 fits within chamber 31 and serves as a spherical piston. The member 11 is rotated by moving actuating lever 17. The material flowing into inlet 20 fills chamber 31 moving ball 35 to seat 32 at which time flow ceases. When member 11 is rotated 180 degrees seat 32 and ball 35 are then adjacent inlet 20. Flow again commences, moving ball 35 toward outlet 21. This forces a measured amount of the material out through outlet 21 and at the same time chamber 31 is refilled, ball 35 now resting on seat 33. The procedure is repeated either by continuing to rotate the member in the same direction or in a reverse direction back to the position illustrated in FIGURE 1. Opening 24 provides means for flushing the outlet of the apparatus.

Where the amount being fed necessitates infrequent actuation, as for example, at periods of several hours, lever 17 can be actuated by hand at the prescribed intervals. However, where the actuating interval is comparatively short it is preferable that the rotatable member be actuated by mechanical means in a time cycle. For example, as illustrated in FIGURE 5, an air cylinder 40, connected to a source of high pressure air by conduit 41, actuates a rack 42 which, in turn, moves pinion 43 which is attached to pin 30, the remaining structure being identical with that illustrated in FIGURE 1. Other suitable mechanical means can be employed such as, for example, an electric motor or air motor geared to pin 30. Such motors can be provided with limit stops so that the rotatable member 11 moves 180 degrees for each actuation of the motor, or, where the feed rate demands, continuous rotation of the member can be used as long as the speed of rotation is not so rapid that chamber 31 does not have sufficient time to fill under the conditions existing at inlet 20 and outlet 21.

The metering device illustrated in FIGURE 2 comprises 3 pairs of inlet and outlet openings and 3 chambers in the rotatable member 49, provided with balls 59, 60, and 61 respectively. Pairs of ball seats 66-67, 62-63 and 64-65 are provided also at the ends of the chambers 56, 57, 58. In the embodiment illustrated in FIGURE 2 one ball seat in each chamber is formed by a threaded insert and the threads in member 49 can extend for some distance into the respective chambers to permit the position of these seats to be adjusted to change the effective volume of the chambers by varying the length of travel of the various balls. Volume control can also be obtained by varying the diameter of the chambers either at the time of manufacture or by the insertion of sleeves. Some form of volume variation is useful, as for example, when a metering device of this type is used to feed several components into a single reaction zone, the volume variation providing means to change the relative proportion of the components while the number of rotations of the unit determines the rate of feed. In an application such as described, the inlets 50, 52 and 54 are all attached to separate souces of supply while the outlets 51, 53 and 55 are either manifolded to feed a common supply conduit or all connected into the reaction zone. Means for flushing the outlets (not shown) can be provided.

Figure 3:
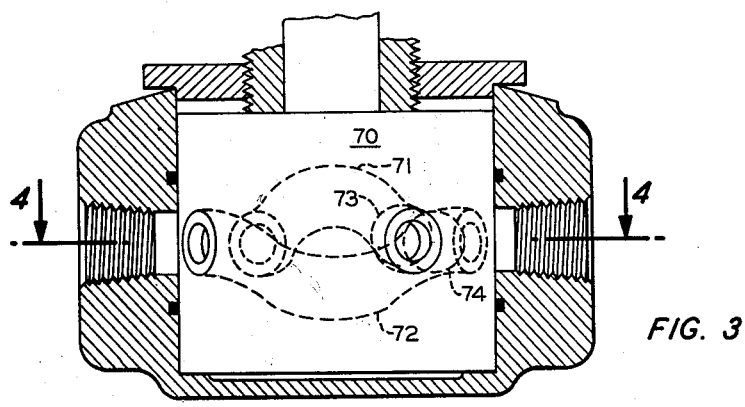
FIGURE 3 is a vertical cross section of a metering apparatus having two non-communicating chambers with all openings in a single plane perpendicular to the axis of rotation of the member containing the chambers.

In the apparatus illustrated in FIGURES 3 and 4, two non-communicating chambers having their various inlets and outlets all opening in a single plane perpendicular to the axis of rotation of the rotatable member are illustrated. In this apparatus, the chambers 71 and 72 are curved in opposite directions axially within rotatable member 70 so that they do not communicate even though all the openings are in the single plane. These chambers also are provided with balls 73 and 74 which seat in seats at each end of the chambers. Such a device can be used to feed a plurality of streams with a relatively small amount of rotation thus permitting rapid actuation and reduced wear. As illustrated in FIGURE 4 one component is fed through inlet 75 and discharges through outlet 76. The same component is fed to inlet 77 and to outlet 78. Another component is fed to inlet 80, outlet 81, inlet 82 and outlet 83. Thus, by rotating the member 70 through a relatively small angle and back both components can be fed.

In one installation my metering apparatus was installed between a catalyst pot and a pressure vessel wherein a polymerization reaction was carried out and a pressure differential maintained across the apparatus so that, as the device was rotated 180 degrees, measured amounts of the catalyst were fed to the pressure vessel. This is illustrated in FIGURE 6, in which the metering apparatus 84 is used to meter a slurried catalyst through line 85 into reactor 86. The monomer and solvent were fed through line 87 and the product removed through line 88. Solvent line 25 is provided as shown.

In this installation the metering apparatus was made as illustrated in FIGURE 1, sleeve 12, diaphragm 13 and disk 14 being made of polytetrafluoroethylene, while the metal portions, including ball 35, were made of stainless steel. Chamber 31 and ball 35 had a diameter of 3.5 mm., with suitable clearance, and the distance through which ball 35 moved was 16 mm., thus feeding 1.5 cc. per stroke. The catalyst feed was $TiCl_3$ slurried in hexane and heptane and the pressure vessel was a 150 gallon propylene polymerization reactor, containing 80-100 gallons of propylene and propane and a diethylaluminum chloride catalyst. The pressure upstream of the metering apparatus was maintained at 350 p.s.i.g. while the reactor pressure and temperature were 250 p.s.i.g. and 110° F. During a three-month period the metering device was turned by hand 1 to 8 revolutions per hour as necessary to keep the solids content in the reactor constant at its desired value, 2 turns per hour giving about 50 volume percent of polymer in the reactor.

Although my invention is particularly well suited for feeding catalysts, especially slurried materials, it is applicable to the feeding of any fluent material. In some instances it is desirable to make the piston of a resilient, low-frictional material, such as polytetrafluoroethylene, polyethylene, etc.

In this application the term "piston" is used in a broad sense to mean a sliding member moved by fluid pressure and includes cylindrical pistons as well as the spherical pistons disclosed in the drawing. The rotatable member can be cylindrical, in the form of a tapered plug or spherical or a modification of one of these, the primary considerations being ease of rotation, effectiveness of seal, wear and ease of manufacture.

Reasonable variations and modifications are possible within the scope of my invention which sets forth method and apparatus for metering a material by successively filling and discharging a chamber having a piston which seats at either end of the chamber, the alternate filling and discharging being accomplished by aligning the chamber alternately for opposite directions of flow therethrough.

I claim:

1. A metering apparatus comprising a body and a member rotatable therein, a chamber in said member having two openings, a piston in said chamber, a seat in said member for said piston adjacent each of said two openings, each of said seats serving to maintain said piston entirely within said chamber and to close the space between said piston and said member, at least one inlet in said body, at least one outlet in said body, and means for rotating said member to connect each of said openings alternately with an inlet and an outlet.

2. A metering apparatus comprising a body and a member rotatable therein, a generally cylindrical chamber extending through said member, a spherical piston in said chamber having a diameter substantially equal to the diameter of said chamber, a seat in said member for said piston adjacent each end of said chamber, each of said seats serving to maintain said piston entirely within said chamber and to close the space between said piston and said member, an inlet in said body, an outlet in said body, and means to rotate said member to place each end of said chamber alternately in communication with said inlet and said outlet.

3. A metering apparatus comprising a body and a member rotatable therein, a plurality of noncommunicating generally cylindrical chambers extending through and separated along the axis of rotation of said member, a spherical piston in each of said chambers, a seat in said member for each of said pistons adjacent each opening of said chambers, each of said seats serving to maintain the corresponding piston entirely within the corresponding chamber and to close the space between the piston and the member, an inlet and an outlet of said body corresponding with each of said chambers, means to rotate said member to a plurality of positions, each of said chambers extending between one of said inlets and one of said outlets, in more than one of said positions.

4. A metering apparatus comprising a body having at least one inlet and one outlet and a member rotatable within said body, a plurality of non-communicating chambers within said member, each of said chambers extending through said member and terminating in a pair of openings on opposite sides of said member, all of said openings and said inlet and said outlet being cut by a single plane perpendicular to the axis of rotation of said member, means for rotating said member to a plurality of positions, each of said chambers in one of said positions extending between an inlet and an outlet for flow therethrough in a first direction and in another of said positions extending between an inlet and an outlet for flow therethrough in the opposite direction, a piston freely moveable in each of said chambers and a seat in said member for said piston adjacent each of said openings.

5. A metering apparatus comprising a body having two inlets and two outlets each outlet spaced 180 degrees from an inlet, a member rotatable within said body, a pair of non-communicating chambers with said member, each of said chambers extending through said member and terminating in a first opening and a second opening spaced 180 degrees apart on said member, all of said openings and said inlets and outlets being cut by a single plane perpendicular to the axis of rotation of said member, means for rotating said member to a plurality of positions, each of said chambers in one of said positions extending between an inlet and an outlet for flow therethrough in a first direction and in another of said positions extending between an inlet and an outlet for flow therethrough in the opposite direction, a spherical piston freely moveable in each of said chambers having a diameter substantially equal to the diameter of the corresponding chamber, a seat in said member for each of said pistons adjacent each end of the corresponding chamber.

6. A metering apparatus comprising a body and a member rotatable therein, a generally cylindrical chamber extending through said member, a spherical piston in said chamber having a diameter substantially equal to the diameter of said chamber, a seat in said member for said piston adjacent each end of said chamber, each of said seats serving to maintain said piston entirely within said chamber and to close the space between said piston and said member, an inlet in said body, an outlet in said body, means to rotate said member to place each end of said chamber alternately in communication with said inlet and said outlet, and a second inlet adjacent said outlet for injecting a flushing fluid.

7. Apparatus for carrying out a catalytic reaction comprising a reactor, means for feeding a reactant to said reactor, means for removing a product from said reactor, and means for feeding slurried catalyst to said reactor comprising a metering apparatus including a body for an inlet and an outlet, a member rotatable within said body, a generally cylindrical chamber extending through said member, said chamber extending from said inlet to said outlet in more than one position of said member, a piston in said chamber, a seat in said member for said piston adjacent each end of said chamber, said piston being moveable responsive to flow through said inlet to close said outlet in each of said positions, and means to rotate said member to place each end of said chamber alternately in communication with said inlet and said outlet.

8. A metering apparatus, comprising:
a body having an inlet and an outlet;
a member rotatable within said body and having a generally cylindrical chamber extending therethrough at right angles to the axis of rotation of said member;
resilient means substantially filling the space between said member and said body, said resilient means comprising a sleeve surrounding said member, a thrust disc at one end of said member, and a diaphragm on the other end of said member;
a spherical piston in said chamber having a diameter substantially equal to the diameter of said chamber;
a first seat for said piston in said chamber adjacent one end thereof, said first seat being integral with said member;
a second seat for said piston in said chamber at the other end thereof, said second seat being removably attached to said member; and
means to rotate said member to place each end of said chamber alternately in communication with said inlet and said outlet.

9. Apparatus for carrying out a catalytic reaction comprising:
a reactor;
means for feeding a reactant to said reactor;
means for removing a product from said reactor;
means for feeding catalyst slurry to said reactor, said means for feeding comprising:
a body having an inlet and an outlet;
a member rotatable within said body and having a generally cylindrical chamber extending therethrough at right angles to the axis of rotation of said member;
resilient means substantially filling the space between said member and said body, said resilient means comprising a sleeve surrounding said member, a thrust disc at one end of said member, and a diaphragm on the other end of said member;
a spherical piston in said chamber having a diameter substantially equal to the diameter of said chamber;
a first seat for said piston in said chamber adjacent one end thereof, said first seat being integral with said member;
a second seat for said piston in said chamber adjacent the other end thereof, said second seat being removably attached to said member; and
means to rotate said member to place each end of said chamber alternately in communication with said inlet and said outlet.

10. A metering apparatus, comprising:
a body having an inlet and an outlet;
a member rotatable within said body and having a generally cylindrical chamber extending therethrough at right angles to the axis of rotation of said member;
a spherical piston in said chamber having a diameter substantially equal to the diameter of said chamber;
a first seat for said piston in said chamber adjacent one end thereof, said first seat being integral with said member;
a second seat for said piston in said chamber adjacent the other end thereof, said second seat being removably attached to said member, each of said seats serving to maintain said piston entirely within said chamber and to close the space between said piston and said member to prevent fluid flow therebetween; and
means to rotate said member to place each end of said chamber alternately in communication with said inlet and said outlet.

11. Apparatus for carrying out a catalytic reaction comprising:
a reactor;
means for feeding a reactant to said reactor;
means for removing a product from said reactor;
means for feeding catalyst slurry to said reactor, said means for feeding comprising:
a body having an inlet and an outlet;
a member rotatable within said body and having a generally cylindrical chamber extending therethrough at right angles to the axis of rotation of said member;
a spherical piston in said chamber having a diameter substantially equal to the diameter of said chamber;
a first seat for said piston in said chamber adjacent one end thereof, said first seat being integral with said member;
a second seat for said piston in said chamber adjacent the other end thereof, said second seat being removably attached to said member, each of said seats serving to maintain said piston entirely within said chamber and to close the space between said piston and said member to prevent fluid flow therebetween; and means to rotate said member to place each end of said chamber alternately in communication with said inlet and said outlet.

References Cited in the file of this patent

UNITED STATES PATENTS

| | | |
|---|---|---|
| 1,975,154 | Jordan | Oct. 2, 1934 |
| 2,085,669 | Noyes | June 29, 1937 |
| 2,292,196 | Brynoldt | Aug. 4, 1942 |
| 2,395,079 | Sparks et al. | Feb. 19, 1946 |
| 2,468,675 | Leonard | Apr. 26, 1949 |
| 2,643,183 | Efferson | June 23, 1953 |